United States Patent [19]

Lundgren et al.

[11] Patent Number: 4,669,911

[45] Date of Patent: Jun. 2, 1987

[54] CLAMPING RING WITH VARIABLE BORE SIZE

[75] Inventors: Bengt Lundgren, Uddevalla; Rune Adolfsson, Borås, both of Sweden

[73] Assignee: SKF Nova AB, Goteborg, Sweden

[21] Appl. No.: 769,728

[22] Filed: Aug. 27, 1985

[30] Foreign Application Priority Data

Oct. 16, 1984 [SE] Sweden ............................ 8405144

[51] Int. Cl.$^4$ ..................... B25G 3/00; B65D 63/00
[52] U.S. Cl. ............................ 403/344; 403/362; 403/374; 403/409.1; 24/19; 24/268
[58] Field of Search ............... 403/344, 290, 338, 311, 403/312, 362, 409.1, 314, 374, 370; 24/20 LS, 19, 268, 279

[56] References Cited

U.S. PATENT DOCUMENTS

| | | | |
|---|---|---|---|
| 2,244,351 | 6/1941 | Venables | 403/344 |
| 2,357,171 | 8/1944 | Carlson | 403/314 |
| 2,417,741 | 3/1947 | Dillon | 24/279 |
| 3,141,688 | 7/1964 | Taylor, Jr. et al. | 403/344 |
| 3,231,298 | 1/1966 | Tomb et al. | 24/268 |
| 3,718,353 | 2/1973 | Charcharos | 403/338 |
| 4,074,402 | 2/1978 | Taketani | 24/268 |
| 4,380,405 | 4/1983 | Kaneki et al. | 403/409.1 |
| 4,407,603 | 10/1983 | Lundgren | 403/370 |

FOREIGN PATENT DOCUMENTS 3237627  4/1984  Fed. Rep. of Germany ...... 403/338

Primary Examiner—Cornelius J. Husar
Assistant Examiner—Peter M. Cuomo
Attorney, Agent, or Firm—Eugene E. Renz, Jr.

[57] ABSTRACT

A clamping ring for use e.g. as a support around a jointing sleeve during explosion welding consists substantially of two preferably equal ring halves (1,2) connected to each other over slots (3) limited by flanges (4,5) comprising surfaces (6,7) which form an angle ($\alpha$). The surfaces co-operate with opposing surfaces (10,11) on an annular clamping member (9) which enclosed the flanges. Means, e.g. screws (12), are provided for bringing about a wedging action by displacing of the clamping member in relation to the clamping ring, thereby varying the bore circumference of the clamping ring. The force uniting the clamping ring halves is completely taken up by the clamping member (9) and does not stress the screws (12).

4 Claims, 3 Drawing Figures

CLAMPING RING WITH VARIABLE BORE SIZE

FIELD OF THE INVENTION

The present invention relates to a clamping means for securing a clamping ring in place on a cylindrical element or the like.

Such a ring is intended for surrounding a cylindrical element and is useful e.g. for fastening an object to the cylindrical element or for protecting it.

BACKGROUND OF THE INVENTION

During e.g. explosion welding of tubes by means of an internal annular explosive charge and an external joint sleeve there is a need for detachable supporting ring outside the charge and the sleeve in order to prevent a plastic diameter increase of the tube and the sleeve caused by the explosion pressure. The supporting ring must be divisible in order to permit mounting and dismounting around a tube, and at the same time it must be rigid and strong in order to sustain the forces developed during the explosion. It is known to wind a steel band around the sleeve for taking up the forces, but this method is complicated. It is also known to use two ring halves which are screwed together with screws arranged across the splits between the ring halves in the parting plane of the ring. In such a joint the screws take up the whole load caused by the explosion. The screws are, as a rule, weaker than the rest of the ring, and are plastically extended by each explosion. Furthermore, the screw bores weaken the flanges through which the screws are arranged, so that any attempt to solve the first mentioned problem by increasing the cross section area of the screws results in a further weakening of the flanges by larger bores.

It is also known to interconnect abutting ends of a split ring by U-shaped clamping members which enclose flange-like protrusions on the respective ring halves and perform a wedging action when displaced along the flanges. Such a device is shown e.g. in the DE patent application 838.333. In this device the clamping member is easily deformed when subjected to heavy loads, bending out the legs of the U profile so that the joint is destroyed.

With the foregoing in mind, it is an object of the present invention to provide a clamping ring assembly characterized by novel features of construction and arrangement which is easy to mount and dismount and which is capable of taking up heavy leads without danger of being deformed. To this end, the clamping assembly comprises a pair of ring parts having radially projecting flanges defining a slot therebetween. Each of the ring parts has a extending flange (4,5) which limits the slot. The flanges are surrounded by a clamping member (9). A surface (7,8) cooperating with a corresponding surface (10,11) on the clamping member is provided on each flange. The sections of the surface (7,8,10,11) with a plane across the slot parallel to the axis of the clamping ring constitute straight lines which form an angle ($\alpha$), characterized by that the clamping member is annular and made in one piece, and that means (12,15) are provided between the clamping member in relation to the flanges (4,5) in the axial direction of the clamping ring.

Such a ring comprises parts which are easily made by e.g. moulding two identical halves which can be interconnected and tightened against each other by tightening screws which need not be stressed to more than a fraction of the total pre-stressing force of the ring halves and which are not loaded by e.g. forces caused by explosion if the device is used in explosion welding equipment. The whole stress is taken up over rigid clamping members.

DESCRIPTION OF THE DRAWINGS

The following is a detailed description of the invention with reference to the accompanying drawing, in which FIG. 1 shows a portion of a clamping ring according to I—I in FIG. 2 in a plan perpendicular to the central axis of the ring and FIG. 2 shows a section according to II—II in FIG. 1 in a plane parallel to the central axis of the ring, whereas

DESCRIPTION OF THE PREFERRED EMBODIMENTS

Figure 1:
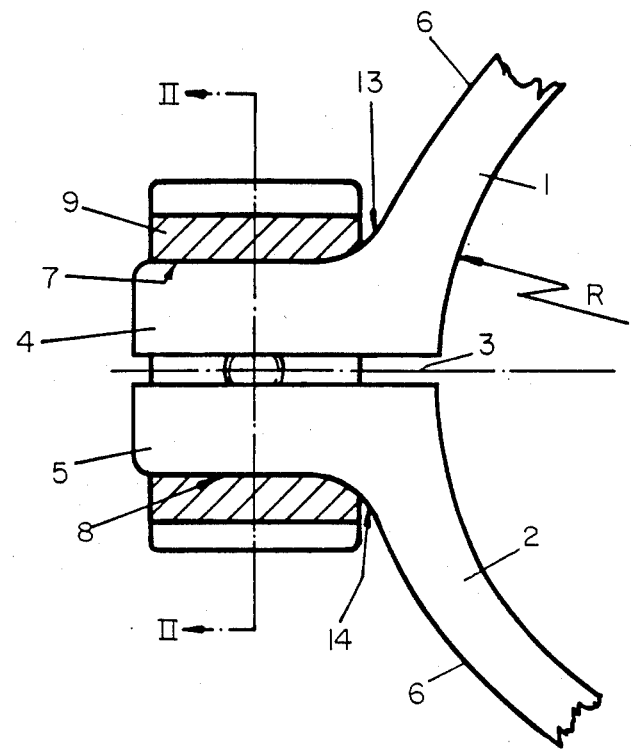
Figure 2:
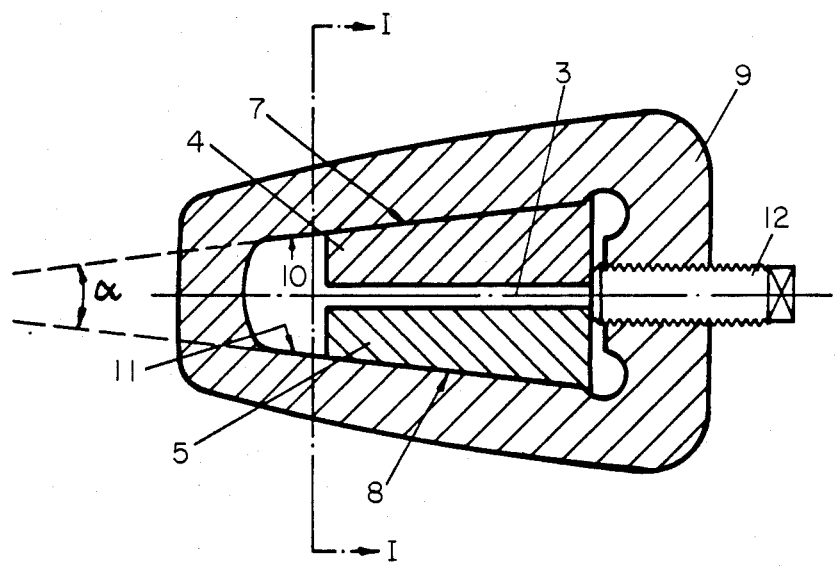

The clamping ring shown consists of two halves 1,2 surrounding a substantially circular cylindrical bore with the radius R. The halves are separated from each other by a slot 3 at each of the connections of the ring halves to each other. Both connections are suitably equal, and only one of them is shown. The slot 3 is limited by flanges 4,5 extending radially outwards from the envelope surface 6 of the clamping ring. The flanges comprise means for varying the width of the slot 3 and thereby of the circumference of the clamping ring. To this end the flanges 4,5 are provided with surfaces 7,8 whose sections with a plane across the slot 3 and parallel to the axis of the clamping ring, i.e. the plane of section according to FIG. 2, form an angle $\alpha$ with each other. The two clamping ring halves are kept together by clamping members 9, which surround the flanges 4,5 at the ends of the respective clamping ring halves. The clamping members have surfaces 10,11, which co-operate with the surfaces 7,8 on the flanges and constitute straight lines forming an angle $\alpha$ with each other in a section parallel to the axis of the clamping ring, i.e. the section shown in FIG. 2. The clamping member 9 comprises means, here shown in the form of a screw 12 abutting an end plane of the clamping ring and being arranged in a threaded bore in the clamping member parallel to the central axis of the clamping ring, for displacing the member 9 in relation to the flanges in a direction parallel to the central axis of the clamping ring. The surfaces 7,8,10,11 may be completely flat, but in order to provide a favorable connection between the flanges 4,5 and the clamping ring halves 1,2 the surfaces can be curved in the area 13,14 where they adjoin the envelope surface 6 of the clamping ring, so that a great radius decreases the stress concentrations which occur when the joint is a sharp angle. By the fact that also the surfaces 10,11 are curved, the clamping member 9 can be placed close to the envelope surface of the clamping ring, which minimizes the bending moments on the flanges 4,5.

In the desired embodiment the ring halves can be made from e.g. two identical moulded parts of nodular cast iron or other suitable material. The ring halves can easily be arranged e.g. around a tube or a sleeve in any desired position and can be interconnected by placing the clamping members around the flanges 4,5 and displacing them parallel to the central axis of the clamping ring by means of the screw 12. When the screw 12 is tightened a sliding motion occurs in the contact between the surfaces 7,8,10 and 11, respectively, whereby a wedging action occurs between the flanges and the clamping member, so that the slot 3 between the clamping ring halves decreases and the circumference of the bore of the clamping ring decreases, causing the clamping ring to be squeezed against the surrounded element. By the fact that the angle α is small and the coefficient of friction in the contact between the surfaces 7,8,10 and 11 is low, the tension force in the screw 12 is transformed into a greater compressing force between the clamping ring halves. The angle α is suitably equal to twice the friction angle for the contact between the surfaces 7,8,10 and 11. Thereby an expansion of the element surrounded by the clamping ring will not cause any load on the screw 12, but the whole load is transmitted over the contact between the surfaces 7,8,10 and 11, and over the clamping member 9.

Figure 3:
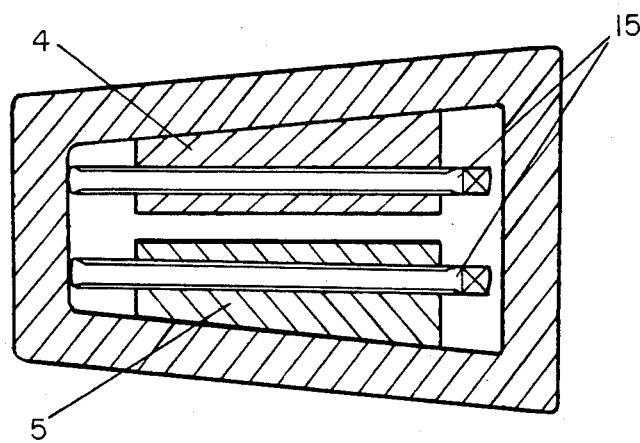
FIG. 3 shows another embodiment of the invention in a section analogous to the one shown in FIG. 2.

FIG. 3 shows a combined mounting and dismounting device comprising screws 15 arranged in threaded bores through the flanges 4,5 parallel to the central axis of the clamping ring. During mounting the screws are turned so that one end on each of them contacts and displaces the clamping member in one direction, and during dismounting, the screws are turned in the opposite direction so that their opposite ends contact opposing portions of the clamping member and displace it in the opposite direction.

Other embodiments of the invention than the ones described above are possible within the scope of the claims. For example, axial displacement of the clamping member 9 can be brought about by other means than by screws, i.e. by a hydraulically operated device. It is also possible to provide the clamping member 9 with special dismounting devices. The clamping ring halves can be connected at one end by a flexible joint instead of by flanges and clamping member, such elements being provided at the other end only.

We claim:

1. A clamping ring assembly comprising at least two ring parts (1,2) each having projecting flanges (4,5) and first oppositely inclined planar clamping surfaces (6, 7) disposed at an angle to a common plane of a slot between the flanges, a clamping member (9) completely surrounding the flanges and having inclined complementary second planar clamping surfaces (10,11) confronting said first clamping planar surfaces, the planar surfaces (7,8,10,11) forming an angle (α) with respect to said common plane, said clamping member being a rigid, integral, continuous, annular member completely surrounding said flanges on all sides, and including an actuating means (12,15) being axially movable relative to the axis of the clamping ring parts for displacing the clamping member and effecting wedging engagement between said confronting planar clamping surfaces (7,8,10,11).

2. The combination as claimed in claim 1, including a screw member (12) which abuts an end plane of the ring parts (1,2) arranged in a threaded bore in the clamping member (9).

3. The combination as claimed in claim 1, including a screw member (15) engageable in a threaded bore in a flange extending between two opposing surfaces on the clamping member parallel to the axis of the clamping ring for contacting said respective surfaces by opposite ends of said screw member.

4. The combination as claimed in claim 1, wherein said angle (α) is about equal to twice the friction angle for the contact between the planar clamping surfaces (7,8,10,11).

* * * * *